United States Patent
Barbieri et al.

(10) Patent No.: US 8,804,536 B2
(45) Date of Patent: Aug. 12, 2014

(54) METHOD AND APPARATUS FOR FACILITATING SENSING IN COGNITIVE RADIO COMMUNICATIONS

(75) Inventors: Alan Barbieri, San Diego, CA (US); Peter Gaal, San Diego, CA (US); Durga Prasad Malladi, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 13/210,327

(22) Filed: Aug. 15, 2011

(65) Prior Publication Data

US 2012/0039183 A1 Feb. 16, 2012

Related U.S. Application Data

(60) Provisional application No. 61/374,033, filed on Aug. 16, 2010.

(51) Int. Cl.
*H04W 24/00* (2009.01)
*H04W 4/00* (2009.01)

(52) U.S. Cl.
USPC ........................................ 370/241.1; 370/328

(58) Field of Classification Search
USPC .................................. 370/241, 328
See application file for complete search history.

(56) References Cited

U.S. PATENT DOCUMENTS

| | | | |
|---|---|---|---|
| 2007/0248076 A1* | 10/2007 | Ji et al. | 370/350 |
| 2007/0254596 A1* | 11/2007 | Corson et al. | 455/68 |
| 2008/0096542 A1* | 4/2008 | Chu et al. | 455/422.1 |
| 2008/0225878 A1* | 9/2008 | Cordeiro et al. | 370/437 |
| 2009/0252077 A1* | 10/2009 | Khandekar et al. | 370/312 |
| 2010/0172311 A1 | 7/2010 | Agrawal et al. | |
| 2010/0177746 A1 | 7/2010 | Gorokhov et al. | |

(Continued)

FOREIGN PATENT DOCUMENTS

| | | |
|---|---|---|
| WO | 2008090509 A2 | 7/2008 |
| WO | 2009069069 A2 | 6/2009 |
| WO | 2009072088 A2 | 6/2009 |

OTHER PUBLICATIONS

Chouinard Gerald, et al., "802.22 Presentation to the ECSG on White Space-sg-whitespace 09-0058r2", Mar. 1, 2009, pp. 1-35, XP55012500, Retrieved from the Internet: URL:https://mentor.ieee.org/802-sg-whitespace/dcn/09/sg-whitespace-09-0058-00-0000-802-22-presentation-to-ecsg.ppt [retrieved on Nov. 18, 2011].

(Continued)

*Primary Examiner* — Chi Pham
*Assistant Examiner* — Fahmida Chowdhury
(74) *Attorney, Agent, or Firm* — François A. Pelaez

(57) ABSTRACT

Techniques are provided for the suppression of reference signal transmissions to enable sensing in cognitive radio communications. In one example, there is provided a method, operable by a network entity (e.g., evolved Node B), that may involve communicating with another network entity to determine parameters of a quiet period, the parameters comprising at least one of when the quiet period occurs and duration of the quiet period. The method may involve transmitting a reference signal in a first channel exclusively during a first plurality of subframes of a first frame period, wherein the first frame period further includes a quiet period during which no signals are transmitted, and performing during the quiet period a sensing operation with respect to the first channel.

21 Claims, 16 Drawing Sheets

(56) References Cited

U.S. PATENT DOCUMENTS

| | | |
|---|---|---|
| 2010/0182903 A1 | 7/2010 | Palanki et al. |
| 2010/0182928 A1* | 7/2010 | Wu et al. ........................ 370/252 |
| 2010/0197330 A1 | 8/2010 | Astely et al. |
| 2010/0203914 A1* | 8/2010 | Shan et al. ..................... 455/509 |
| 2010/0260084 A1* | 10/2010 | Imamura et al. .............. 370/311 |
| 2011/0299509 A1* | 12/2011 | Wang et al. .................... 370/336 |

OTHER PUBLICATIONS

International Search Report and Written Opinion—PCT/US2011/047997—ISA/EPO—Feb. 3, 2012.

Motorola: "Impact of Supporting Blank Sub frames", 3GPP TSG RAN Plenary Meeting No. 42, Athens, Greece, [Online] vol. RP-081059, Dec. 2, 2008, pp. 1-10, XP002589696, Retrieved from the Internet: URL:http://www.3gpp.org/ftp/tsg-ran/tsg-ran/TSGR42/docs/> [retrieved on Jun. 28, 2010] the whole document.

* cited by examiner

*(Sensing Example)*

METHOD AND APPARATUS FOR FACILITATING SENSING IN COGNITIVE RADIO COMMUNICATIONS

CLAIM OF PRIORITY UNDER 35 U.S.C. §119

The present application for patent claims priority to Provisional Application No. 61/374,033 filed Aug. 16, 2010, entitled "METHODS AND APPARATUS FOR RELIABLY SUPRESSING CRS TRANSMISSION TO ENABLE SENSING IN COGNITIVE LTE", and is assigned to the assignee hereof, and is hereby expressly incorporated in its entirety by reference herein.

BACKGROUND

1. Field

The present disclosure relates to wireless communication systems, and more particularly, to techniques for suppressing common reference signals (CRS) for enabling sensing in cognitive Long Term Evolution (LTE) systems.

2. Background

Wireless communication systems are widely deployed to provide various types of communication content such as voice, data, video and the like, and deployments are likely to increase with introduction of new data oriented systems, such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems and other orthogonal frequency division multiple access (OFDMA) systems.

3GPP LTE represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for a number of mobile entities, such as, for example, user equipments (UEs) or access terminals (ATs). A UE may communicate with a base station via the downlink and uplink. The downlink (or forward link) refers to the communication link from the base station to the UE, and the uplink (or reverse link) refers to the communication link from the UE to the base station. Such communication links may be established via a single-in-single-out, multiple-in-signal-out, or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point. Next generation systems, such as LTE, allow for use of MIMO technology for enhanced performance and data throughput.

As the number of entities deployed increases, the need for proper bandwidth utilization on licensed as well as unlicensed RF spectrum becomes more important. Moreover, with the introduction of semiautonomous base stations for managing small cells, such as femtocells and picocells, in systems such as LTE, interference with existing base stations may become an increasing problem.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects of the embodiments described herein, a method is provided for facilitating sensing in cognitive radio communication, wherein the method may be performed by a network entity, such as, for example, an evolved Node B (eNB). The method may involve communicating with another network entity to determine parameters of a quiet period, the parameters including at least one of when the quiet period occurs and duration of the quiet period. The method may further involve transmitting a reference signal in a first channel exclusively during a first plurality of subframes of a first frame period, wherein the first frame period further includes a second plurality of subframes corresponding to the quiet period during which no signals are transmitted. The method may also involve performing, during the quiet period, a sensing operation with respect to the first channel. In related aspects, an electronic device (e.g., an eNB or component(s) thereof) may be configured to execute the above-described methodology.

In accordance with one or more aspects of the embodiments described herein, there is provided a cognitive radio method that may be performed by a mobile entity, such as, for example, a user equipment (UE). The method may involve receiving in a first channel a reference signal during each subframe of a first frame period, the reference signal including an indication of whether a common reference signal (CRS) is present during a given subframe. The method may further involve receiving in the first channel the reference signal exclusively during a first plurality of subframes of a second frame period wherein the second frame period further includes a second plurality of subframes. In related aspects, an electronic device (e.g., a UE or component(s) thereof) may be configured to execute the above-described methodology.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Techniques for supporting cognitive radio communication are described herein. The techniques may be used for various wireless communication networks such as wireless wide area networks (WWANs) and wireless local area networks (WLANs). The terms "network" and "system" are often used interchangeably. The WWANs may be CDMA, TDMA, FDMA, OFDMA, SC-FDMA and/or other networks. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a radio technology such as IEEE 802.11 (Wi-Fi), Hiperlan, etc.

The techniques described herein may be used for the wireless networks and radio technologies mentioned above as well as other wireless networks and radio technologies. For clarity, certain aspects of the techniques are described below for 3GPP network and WLAN, and LTE and WLAN terminology is used in much of the description below. The word "exemplary" is used herein to mean "serving as an example, instance, or illustration." Any embodiment described herein as "exemplary" is not necessarily to be construed as preferred or advantageous over other embodiments.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
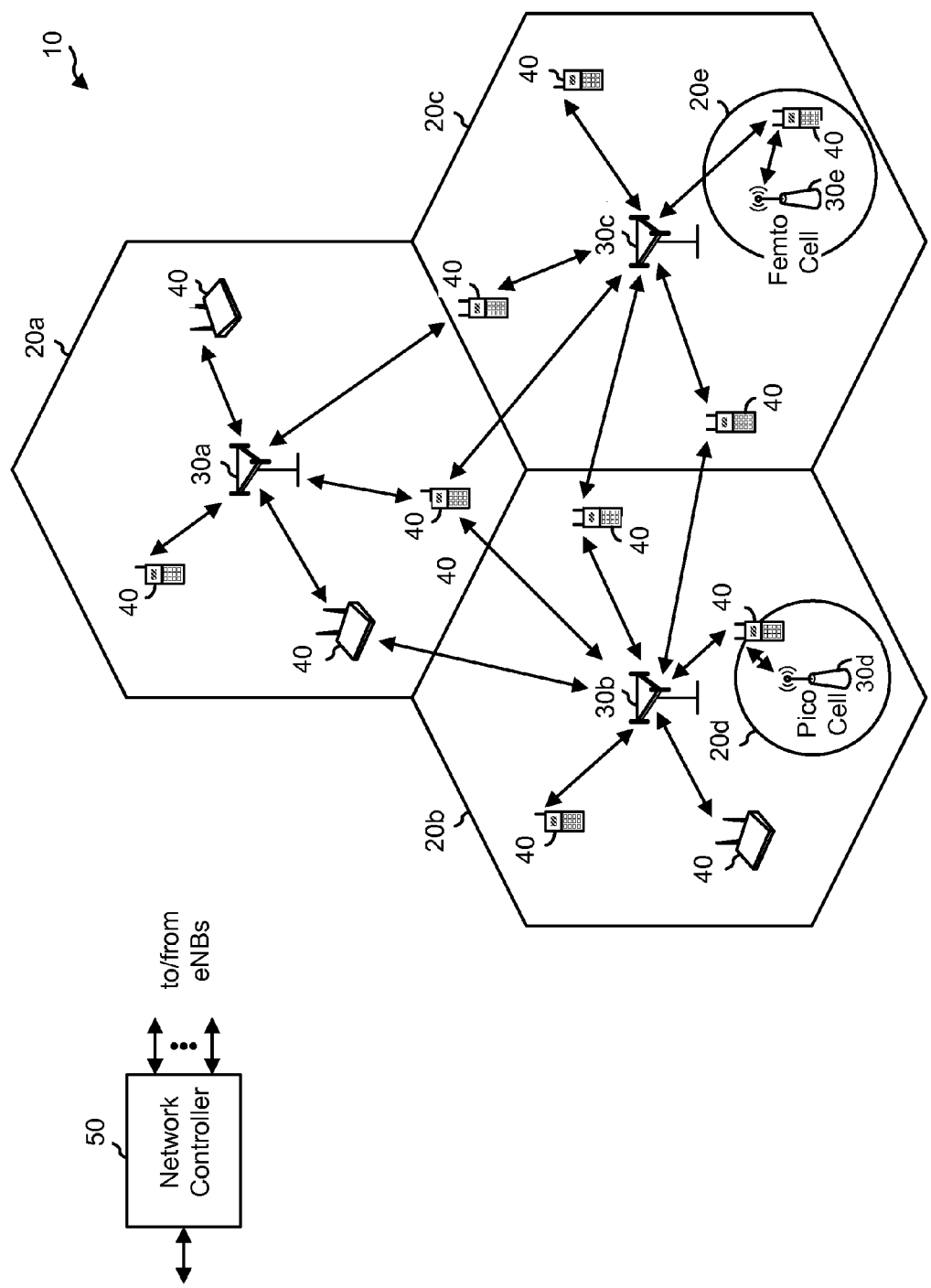
FIG. 1 is a block diagram conceptually illustrating an example of a telecommunications system.

FIG. 1 shows a wireless communication network 10, which may be an LTE network or some other wireless network. Wireless network 10 may include a number of evolved Node Bs (eNBs) 30 and other network entities. An eNB may be an entity that communicates with mobile entities (e.g., user equipment (UE)) and may also be referred to as a base station, a Node B, an access point, etc. Although the eNB typically has more functionalities than a base station, the terms "eNB" and "base station" are used interchangeably herein. Each eNB 30 may provide communication coverage for a particular geographic area and may support communication for mobile entities (e.g., UEs) located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1A, eNBs 30a, 30b, and 30c may be macro eNBs for macro cell groups 20a, 20b, and 20c, respectively. Each of the cell groups 20a, 20b, and 20c may include a plurality (e.g., three) of cells or sectors. An eNB 30d may be a pico eNB for a pico cell 20d. An eNB 30e may be a femto eNB or femto access point (FAP) for a femto cell 20e.

Wireless network 10 may also include relays (not shown in FIG. 1A). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 50 may couple to a set of eNBs and may provide coordination and control for these eNBs. Network controller 50 may be a single network entity or a collection of network entities. Network controller 50 may communicate with the eNBs via a backhaul. The eNBs may also communicate with one another, e.g., directly or indirectly via a wireless or wireline backhaul.

UEs 40 may be dispersed throughout wireless network 10, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, etc. A UE may also be able to communicate peer-to-peer (P2P) with other UEs.

Wireless network 10 may support operation on a single carrier or multiple carriers for each of the downlink and uplink. A carrier may refer to a range of frequencies used for communication and may be associated with certain characteristics. Operation on multiple carriers may also be referred to as multi-carrier operation or carrier aggregation. A UE may operate on one or more carriers for the downlink (or downlink carriers) and one or more carriers for the uplink (or uplink carriers) for communication with an eNB. The eNB may send data and control information on one or more downlink carriers to the UE. The UE may send data and control information on one or more uplink carriers to the eNB. In one design, the downlink carriers may be paired with the uplink carriers. In this design, control information to support data transmission on a given downlink carrier may be sent on that downlink carrier and an associated uplink carrier. Similarly, control information to support data transmission on a given uplink carrier may be sent on that uplink carrier and an associated downlink carrier. In another design, cross-carrier control may be supported. In this design, control information to support data transmission on a given downlink carrier may be sent on another downlink carrier (e.g., a base carrier) instead of the downlink carrier.

Wireless network 10 may support carrier extension for a given carrier. For carrier extension, different system bandwidths may be supported for different UEs on a carrier. For example, the wireless network may support (i) a first system bandwidth on a downlink carrier for first UEs (e.g., UEs supporting LTE Release 8 or 9 or some other release) and (ii) a second system bandwidth on the downlink carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 10 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 10 may support single-user (SU) MIMO, multi-user (MU) MIMO, Coordinated Multi-Point (CoMP), etc. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 10 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 10 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 10 may utilize frequency division duplex (FDD) or time division duplex (TDD). For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time periods. In related aspects, the FAP synchronization algorithm described in further detail below may be applied to the FAPs using FDD or TDD duplexing.

Figure 2:
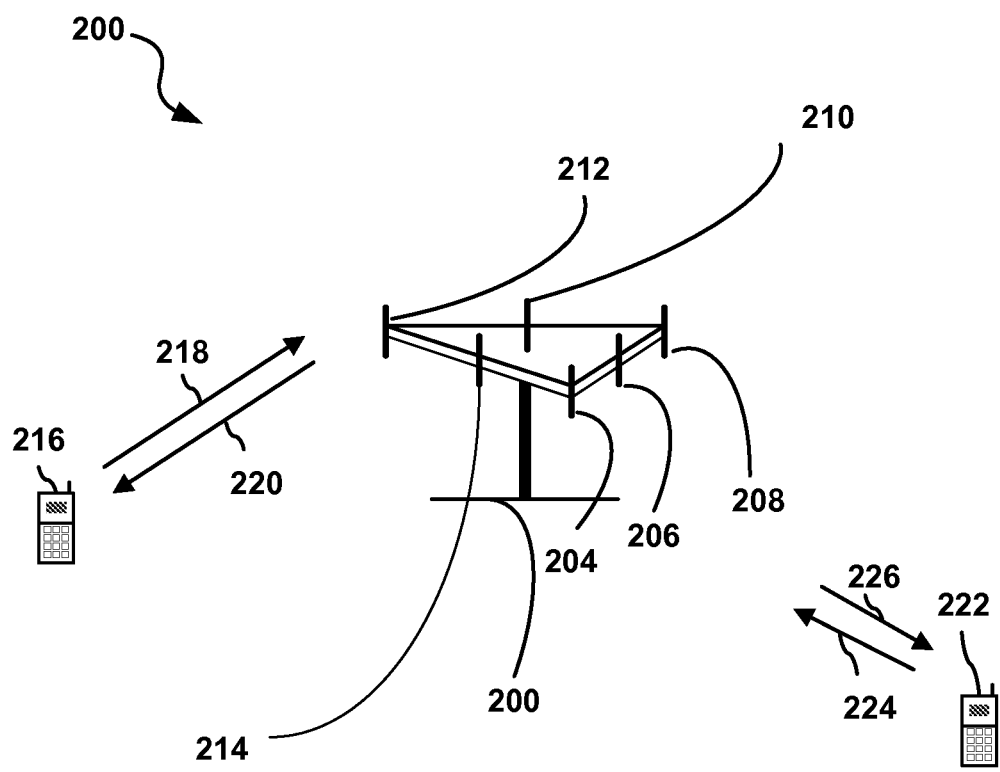
FIG. 2 illustrates details of a wireless communications system including an evolved Node B (eNB) and multiple user equipments (UEs).

Referring now to FIG. 2, a multiple access wireless communication system according to one aspect is illustrated. An access point or eNB 200 includes multiple antenna groups, one including 204 and 206, another including 208 and 210, and an additional including 212 and 214. In FIG. 2, only two antennas are shown for each antenna group, however, more or fewer antennas may be utilized for each antenna group. Access terminal or UE 216 is in communication with antennas 212 and 214, where antennas 212 and 214 transmit information to access terminal 216 over forward link 220 and receive information from access terminal 216 over reverse link 218. Access terminal 222 is in communication with antennas 206 and 208, where antennas 206 and 208 transmit information to access terminal 222 over forward link 226 and receive information from access terminal 222 over reverse link 224. In a FDD system, communication links 218, 220, 224 and 226 may use different frequencies for communication. For example, forward link 220 may use a different frequency then that used by reverse link 218.

Each group of antennas and/or the area in which they are designed to communicate is often referred to as a sector of the access point. Antenna groups each are designed to communicate to access terminals in a sector, of the areas covered by access point 200. In communication over forward links 220 and 226, the transmitting antennas of access point 200 may utilize beamforming in order to improve the signal-to-noise ratio of forward links for the different access terminals 216 and 224. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, evolved Node B (eNB) or some other terminology. An access terminal may also be called an access terminal, user equipment (UE), a wireless communication device, terminal, access terminal or some other terminology.

In accordance with aspects of the subject of this disclosure, cognitive radio refers generally to wireless communication systems where either a wireless network or network node includes intelligence to adjust and change transmission and/or reception parameters to provide efficient communication, while avoiding interference with other licensed or unlicensed users. Implementation of this approach includes active monitoring and sensing of the operational radio environment, which may include frequency spectrum, modulation characteristics, user behavior, network state, and/or other parameters. Multiple-access systems, such as LTE and LTE-A systems, may use cognitive radio techniques to utilize additional available spectrum beyond the specifically licensed spectrum.

Spectrum sensing involves detection of potentially usable spectrum. Once usable spectrum is detected, it may then be used either alone (if unoccupied) or shared, assuming other users are present, without causing harmful interference. Nodes in cognitive radio systems may be configured to sense spectrum holes, which may be based on detecting primary users (such as, for example, licensed users of the shared spectrum), or other users (such as, for example, unlicensed users). Once usable spectrum is selected, it may then be further monitored to detect use by others. For other higher priority users, the spectrum may need to vacated and communications transferred to other channels. For example, if a primary user is detected during initial search, an unlicensed user may be prohibited from using the spectrum. Likewise, if a primary user appears in spectrum being used by an unlicensed user, the unlicensed user may need to vacate.

Spectrum sensing techniques can include transmitter detection, where cognitive radio nodes have the capability to determine if a signal from a primary user is locally present in a certain spectrum. This may be done by techniques such as matched filter/correlation detection, energy or signal level detection, cyclostationary feature detection, or other techniques. A primary user may be a higher priority user, such as a licensed user of shared spectrum which unlicensed users may also use.

Cooperative detection may also be used in some cases where multiple network nodes are in communication. This approach relates to spectrum sensing methods where information from multiple cognitive radio users are incorporated for primary user detection. Interference-based, or other detection methods may likewise be used to sense available spectrum.

Cognitive radio systems generally include functionality to determine the best available spectrum to meet user and/or network communication requirements. For example, cognitive radios may decide on the best spectrum band to meet specific Quality of Service (QOS), data rate requirements, or other requirements over available spectrum bands. This requires associated spectrum management and control functions, which may include spectrum analysis as well as spectrum decision processing to select and allocate available spectrum.

Because the spectrum is typically shared, spectrum mobility is also a concern. Spectrum mobility relates to a cognitive network user changing operational frequency. This is generally done in a dynamic manner by allowing network nodes to operate in the best available frequency band, and maintaining seamless communications during the transition to other/better spectrum. Spectrum sharing relates to providing a fair spectrum scheduling method, which can be regarded as similar to generic media access control (MAC) problems in existing networks.

One aspect of cognitive radio relates to sharing use of licensed spectrum by unlicensed users. Use of this spectrum may be integrated with other wireless communication methodologies, such as LTE.

White spaces (WS) refer to frequencies allocated to a broadcasting service or other licensed user that are not used locally, as well as to interstitial bands. In the United States, the switchover to digital television in 2009 created abandoned spectrum in the upper 700 megahertz band (698 to 806 MHz), and additional whitespace is present at 54-698 MHz (TV Channels 2-51) which is still in use for digital television. Incumbent primary users may include licensed television broadcasters on existing channels, wireless microphone systems, medical devices, or other legacy devices. In 2008, the United States Federal Communications Commission (FCC) approved unlicensed use of this white space. However, these so-called "TV Band Devices," must operate in the vacant channels or white spaces between television channels in the range of 54 to 698 MHz.

Rules defining these devices were published by the U.S. Federal Communications Commission (FCC) in a Second Report and Order on Nov. 14, 2008. The FCC rules define fixed and personal/portable devices. Fixed devices may use any of the vacant US TV channels 2, 5-36 and 38-51 with a power of up to 1 watt (4 watts EIRP). They may communicate with each other on any of these channels, and also with personal/portable devices in the TV channels 21 through 51. Fixed devices must be location-aware, query an FCC-mandated database at least daily to retrieve a list of usable channels at their location, and must also monitor the spectrum locally once every minute to confirm that no legacy wireless microphones, video assist devices, or other emitters are present. If a single transmission is detected, the device may not transmit anywhere within the entire 6 MHz channel in which the transmission was received. Fixed devices may transmit only within the TV channels where both the database indicates operation is permissible, and no signals are detected locally.

Personal/portable stations may operate only on channels 21-36 and 38-51, with a power of 100 mW EIRP, or 40 mW if on a channel adjacent to a nearby television channel. They may either retrieve a list of permissible channels from an associated fixed station, or may accept a lower output power of 50 mW EIRP and use only spectrum sensing.

As noted previously, existing wireless networks may be enhanced by addition of cognitive radio functionality. In one aspect, an LTE system may include cognitive radio functionality as further illustrated below.

Figure 3:
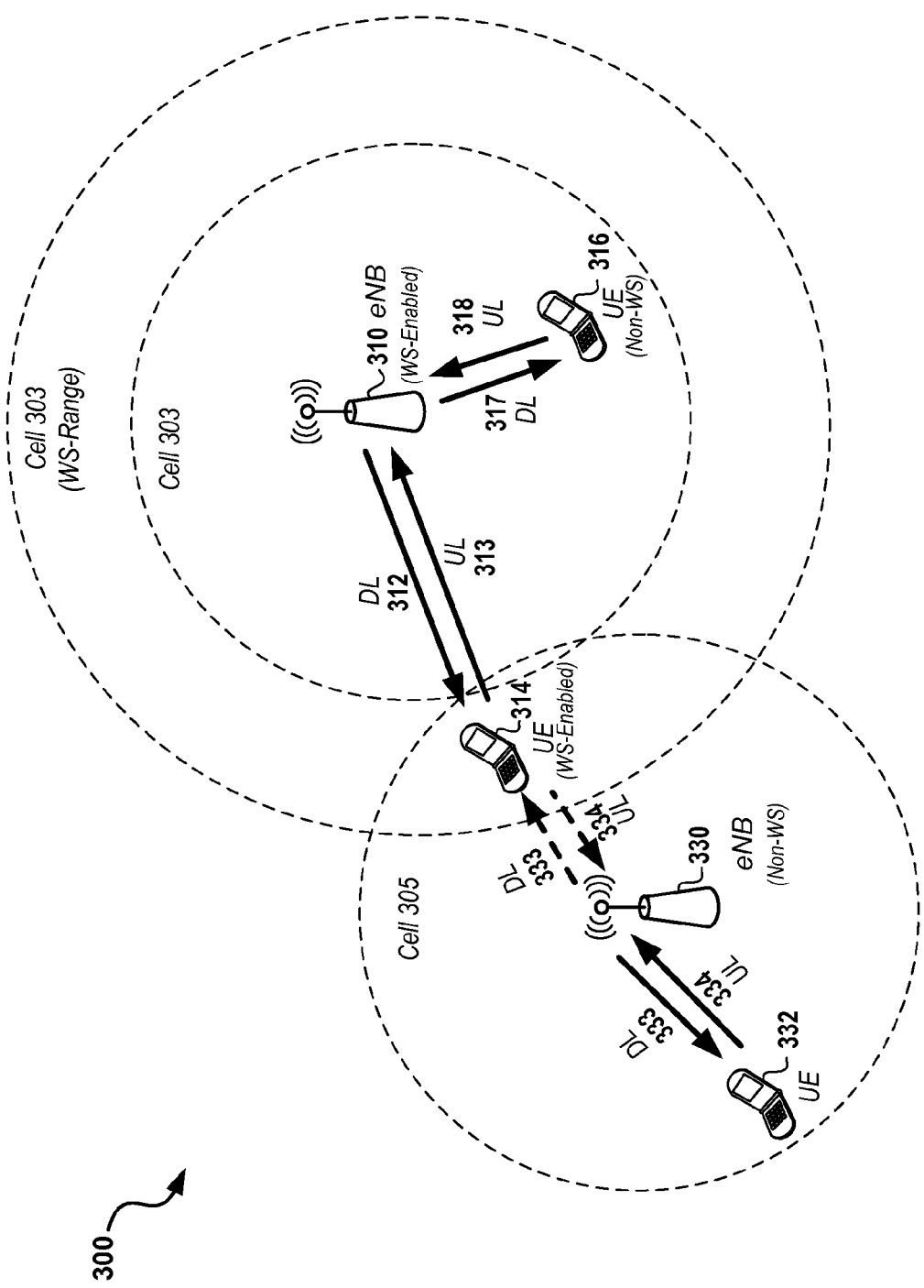
FIG. 3 illustrates a cognitive radio system using white space (WS).

Attention is now directed to FIG. 3, which illustrates an example of a cognitive LTE system 300 configured to utilize white spaces (WS), such as in the UHF television spectrum. A first cell 303 is configured to utilize WS on one or both of the downlink (DL) and uplink (UL). In one implementation, licensed spectrum is used for the UL, while WS may be used for the DL for certain communications. For example, a WS-enabled eNB 310 may be in communication with a first UE 316 as well as a second UE 314. UE 316 may be a non-WS enabled UE, whereas UE 314 may be WS-enabled. (as used herein, WS-enabled refers to a network device configured to utilize white space, typically in addition to licensed spectrum). In the example, DL 317 and UL 318, between eNB 310 and UE 316, are configured to use licensed spectrum, whereas DL 312, between eNB 310 and UE 314, may be configured to use WS, while UL 313 may be configured to use licensed spectrum.

Another cell 305 may be adjacent to cell 303 and may be configured with an eNB 330 to communicate with UE 332 using licensed spectrum for DL 333 and UL 334. In some situations, UE 314 may be within range of eNB 330 and as such may be subject to attempts by UE 314 to access eNB 330.

As noted previously, use of WS by devices in cognitive networks requires sensing of channel conditions. In systems such as LTE systems configured to operate in TV band WS, FCC requirements mandate monitoring the spectrum being utilized by a secondary device (i.e., a non-licensed user) for primary uses and vacation of the channel if a primary user is detected. Typical primary uses may be UHF television channels, wireless microphones, or other legacy devices.

In addition, coordination with other secondary users may be desirable to facilitate frequency sharing. FCC requirements mandate checking the channel for 30 second before switching to a new channel, monitoring channels at least every 60 seconds for primary users, and vacating the channel within 2 second when a primary user is detected. During checking, a quiet period is required in which no signal transmission of any network device is done. For example, in an LTE network having an eNB and three associated UEs, all four of these devices must refrain from transmitting during the quiet period so that other users may be detected.

Figure 4:
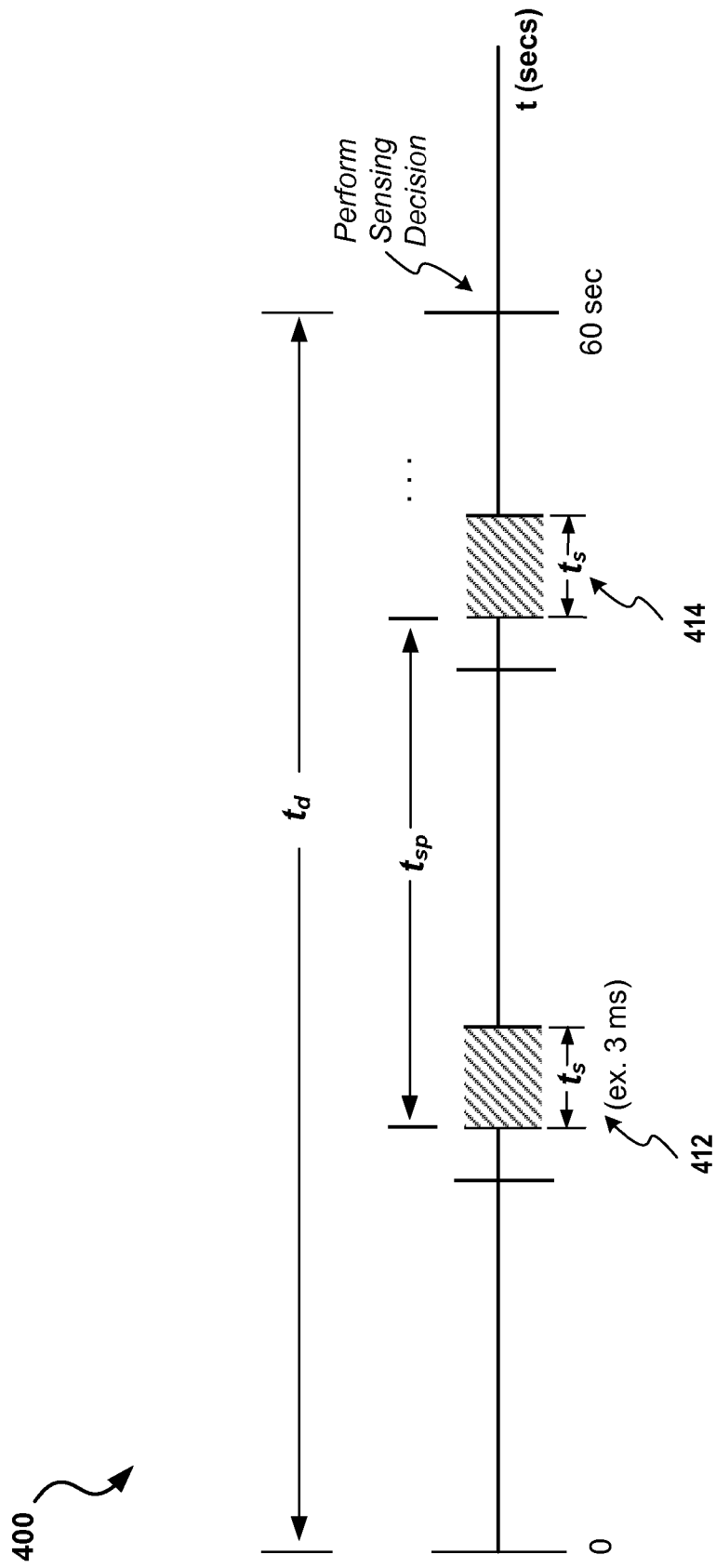
FIG. 4 illustrates an implementation of a timing configuration for providing quiet periods.

Attention is now directed to FIG. 4, which illustrates one embodiment of a signaling configuration for providing coordinated quiet periods for channel sensing. Time interval td represents the required 60 second sensing period. During this period, one or more sensing intervals, denoted as ts, may be implemented, where all network devices refrain from transmitting (i.e., are quiet) during these time intervals. In some cases, a single sensing interval may be used to monitor the channel to detect other users. However, in other implementations multiple sensing intervals may be provided. In the example shown in FIG. 4 sensing intervals 412 and 414 are shown, which may be repeated periodically during the 60 second sensing period (tD). The specific timing may be predefined in the system or may be sent to the network devices, such as in a system information block (SIB) message, such as a SIB1 or SIB2 message. Alternately, sensing intervals may be done in asynchronous fashion, however, the quiet interval information will need to be sent to other network devices, which may increase control signaling. In the example illustrated, sensing intervals have a duration ts, where ts may be 3 milliseconds. This may be advantageous due to LTE system signaling requirements, however, other durations may alternately be used.

LTE systems impose various timing requirements for downlink and uplink signaling. For example, LTE required periodic transmission of control channels, such as PSS/SSS, PBCH, SIB1, etc., as well as CRSs. This creates potential problems when utilizing WS because of the requirement for periodic quiet periods, such as the 60 second sampling and associated quiet period for monitoring described previously. Consequently, cell-wide coordination of quiet periods, along with modification of standardized LTE signaling, may be required.

Figure 5:
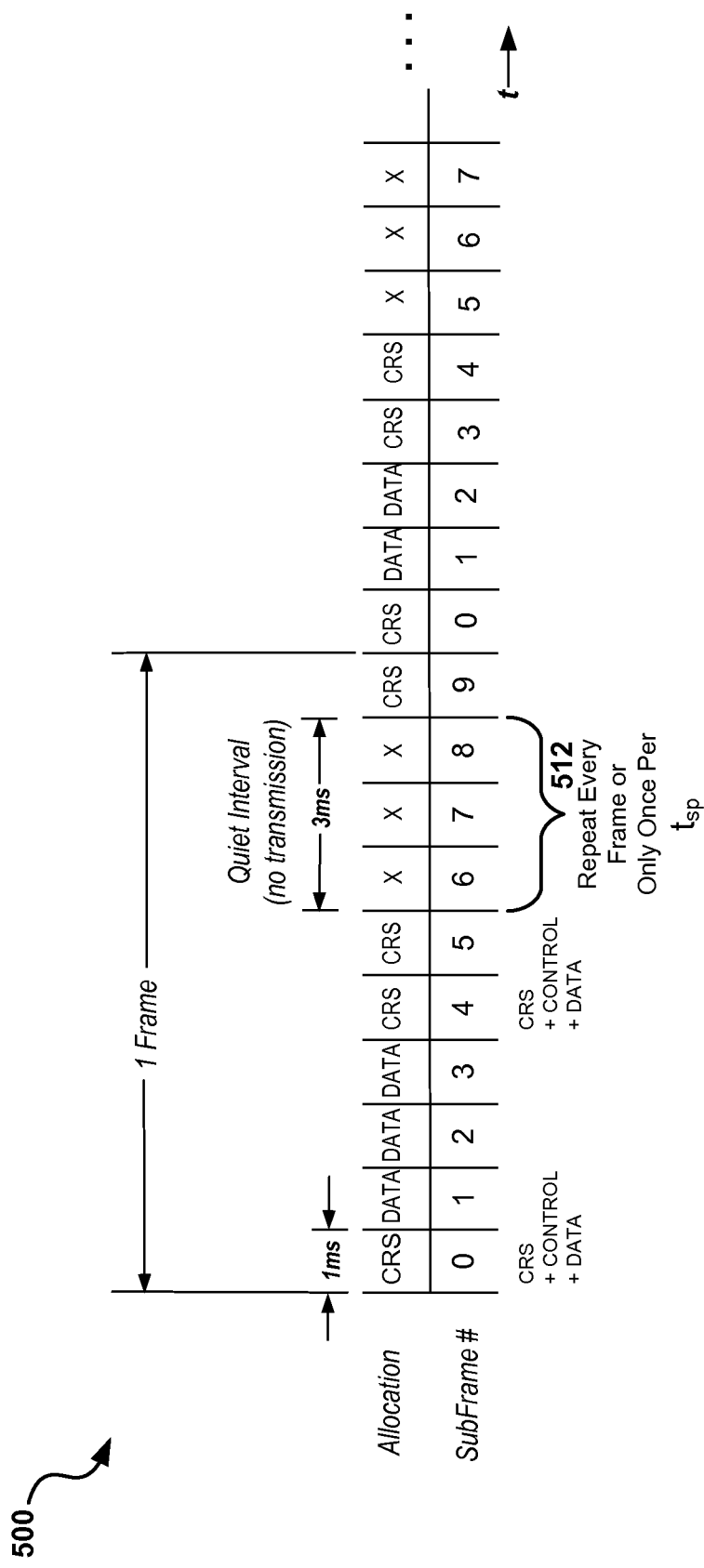
FIG. 5 illustrates details of an embodiment of subframe allocation for providing a quiet period as shown in FIG. 4.

In one aspect, this concern may be addressed by adjusting transmission during certain subframes provided from WS-enabled eNBs (WS-eNBs). This may involve omission of cell-specific or common reference signals (CRS), which are mandatory downlink reference signals used for various UE processing functions, during certain subframes. Attention is now directed to FIG. 5, which illustrates one embodiment of a timing configuration 500 for adjusting subframe transmissions to provide quiet periods. An LTE frame may be divided into 10 subframes, denoted subframes 0 thru 9, which periodically repeat. If it is assumed that there is at least one legacy carrier available, which will carry all control signals as well as CRS (cell specific or common reference signals) in all subframes, then other DL carriers may be configured as shown in FIG. 5 to transmit only in subframes potentially carrying broadcast control channels (including paging). In one embodiment, these may be subframes 0, 4, 5 and 9. In other subframes CRS are omitted, and demodulation of control/data transmission may be done using DRS (demodulation reference signals).

This approach is illustrated in FIG. 5, where subframes 0, 4, 5, and 9 include CRS (as well as control and data information as necessary). Subframes 1, 2, and 3 may carry data (if data is available in DL buffer). Subframes 6, 7, and 8 are quiet subframes where nothing is transmitted by the eNB on the DL. As noted previously, if the UL is done on a licensed spectrum, this presents no issue with the WS quiet period even if UL transmissions are done during the quiet period.

Since each subframe has a time duration of 1 mS, this provides a 3 mS quiet interval, consistent with the timing configuration illustrated in FIG. 4. In some implementations, the quiet interval at subframes 6, 7 and 8 may be provided during each frame. However, in other implementations, the quiet interval may only be provided during each sampling period (i.e., only once during each time interval tsP as shown in FIG. 4, such as once each second). Other periodic or anychronous quite intervals may also be used in some embodiments.

In various implementations, coordination of quiet interval timing may be done via a communication from a WS-eNB, such as eNB 310 as shown in FIG. 3, to connected WS-UEs, such as UE 314. Alternately, the quiet interval timing may be in a lookup table or hard-coded in WS-eNBs, WS-UEs, or other network devices.

In addition to functionality as described previously with respect to WS-eNBs, associated functionality may be implemented in WS-UEs. In particular, a UE in a WS capable system may need to address timing issues associated with omission of CRS from certain subframes, such as from subframes 6, 7, and 8 as shown in FIG. 5. Since UEs may expect CRS during these subframes, such as to perform monitoring functions related to radio link monitoring (RLM), and radio link failure (RLF), as well as to perform other functions, WS-UEs may benefit from reconfiguration to accommodate WS signaling. For example, WS-UEs may include filters that assume CRS in all subframes, e.g., for RLF detection and/or CQI/PMI/RI estimation. In order to address this, a WS-UE may be configured to freeze loops and filters whose inputs are computed from CRS during those subframes where CRS is not transmitted. Using this approach, inputs to these loops and filters would remain at the previous value provided at the last subframe having CRS, and resuming operation at the next available CRS. This may avoid failures such as improperly declaring radio link failure (RLF) based on omitted CRS, which would result in substantial additional system processing to effectively re-establish connection with the WS-UE.

Coordination of this processing may be done based on information sent from the WS-eNB with signal freezing during the quiet periods done in the WS-UE based on the information provided from the WS-eNB. Alternately it may be hard-coded in the WS-UE, or otherwise determined from signals received from the WS-eNB or other network device.

Figure 6:
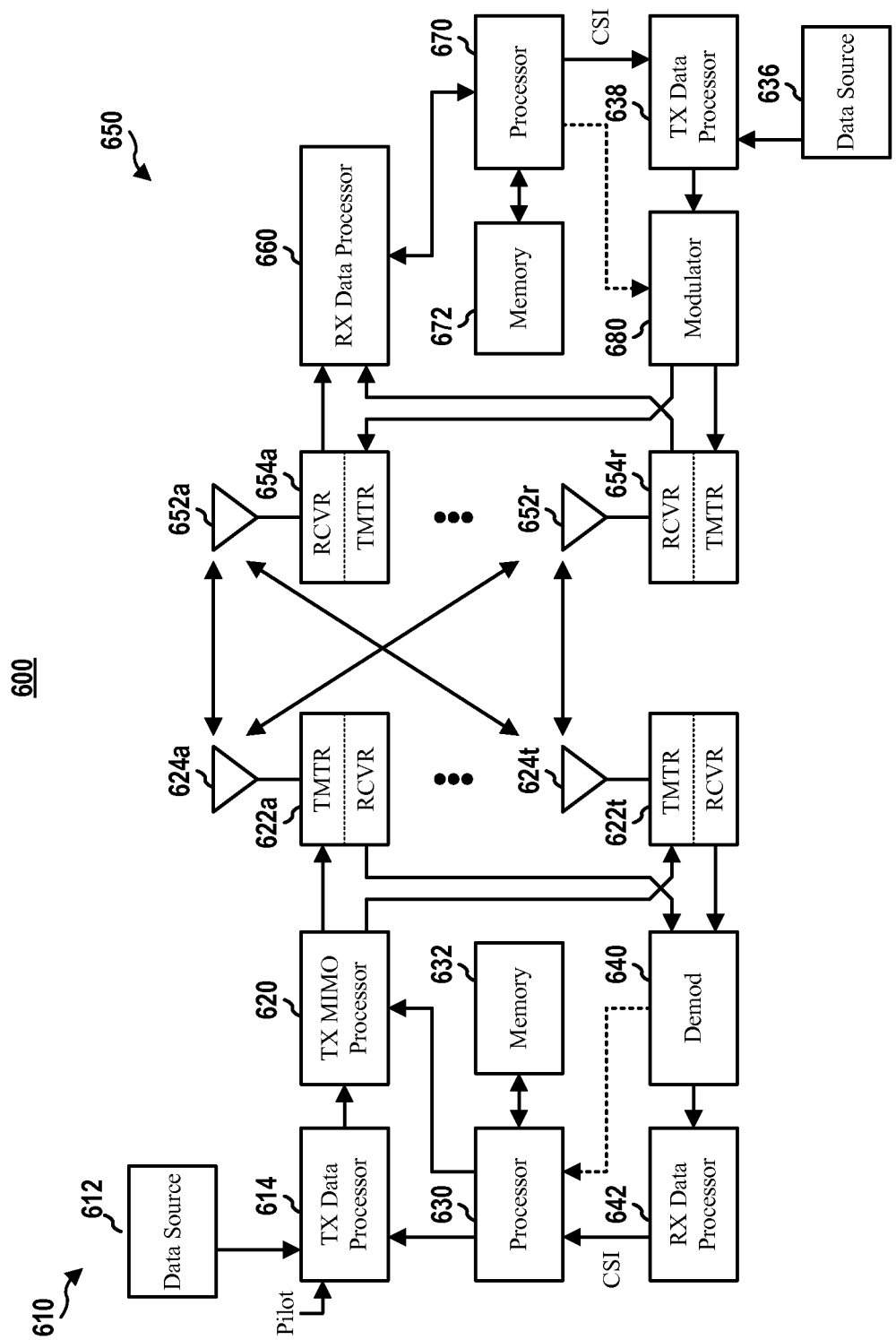
FIG. 6 illustrates embodiments of a WS-enhanced UE and eNB.

Attention is now directed to FIG. 6, which illustrates a system 600 including a transmitter system 610 (also known as the access point or eNB) and a receiver system 650 (also known as access terminal or UE) in an LTE MIMO system 600. At the transmitter system 610, traffic data for a number of data streams is provided from a data source 612 to a transmit (TX) data processor 614. Each data stream is transmitted over a respective transmit antenna. TX data processor 614 formats, codes, and interleaves the traffic data for each data stream based on a particular coding scheme selected for that data stream to provide coded data. Transmitter 610 may be a WS-eNB and system 600 may be included in a WS-enabled system. Likewise, receiver 650 may be a WS-UE.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 630.

The modulation symbols for all data streams are then provided to a TX MIMO processor 620, which may further process the modulation symbols (e.g., for OFDM). TX MIMO processor 620 then provides NT modulation symbol streams to NT transmitters (TMTR) 622a through 622t. In certain embodiments, TX MIMO processor 620 applies beam-forming weights to the symbols of the data streams and to the antenna from which the symbol is being transmitted.

Each transmitter 622 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 622a through 622t are then transmitted from NT antennas 624a through 624t, respectively.

At receiver system 650, the transmitted modulated signals are received by NR antennas 652a through 652r and the received signal from each antenna 652 is provided to a respective receiver (RCVR) 654a through 654r. Each receiver 654 conditions (e.g., filters, amplifies, and down-converts) a respective received signal, digitizes the conditioned signal to provide samples, and further processes the samples to provide a corresponding "received" symbol stream.

An RX data processor 660 then receives and processes the NR received symbol streams from NR receivers 654 based on a particular receiver processing technique to provide NT "detected" symbol streams. The RX data processor 660 then demodulates, de-interleaves, and decodes each detected symbol stream to recover the traffic data for the data stream. The processing by RX data processor 660 is complementary to that performed by TX MIMO processor 620 and TX data processor 614 at transmitter system 610.

A processor 670 periodically determines which pre-coding matrix to use (discussed below). Processor 670 formulates a reverse link message including a matrix index portion and a rank value portion. The reverse link message may include various types of information regarding the communication link and/or the received data stream. The reverse link message is then processed by a TX data processor 638, which also receives traffic data for a number of data streams from a data source 636, modulated by a modulator 680, conditioned by transmitters 654a through 654r, and transmitted back to transmitter system 610.

At transmitter system 610, the modulated signals from receiver system 650 are received by antennas 624, conditioned by receivers 622, demodulated by a demodulator 640, and processed by a RX data processor 642 to extract the reserve link message transmitted by the receiver system 650. Processor 630 then determines which pre-coding matrix to use for determining the beam-forming weights then processes the extracted message.

Figure 7:
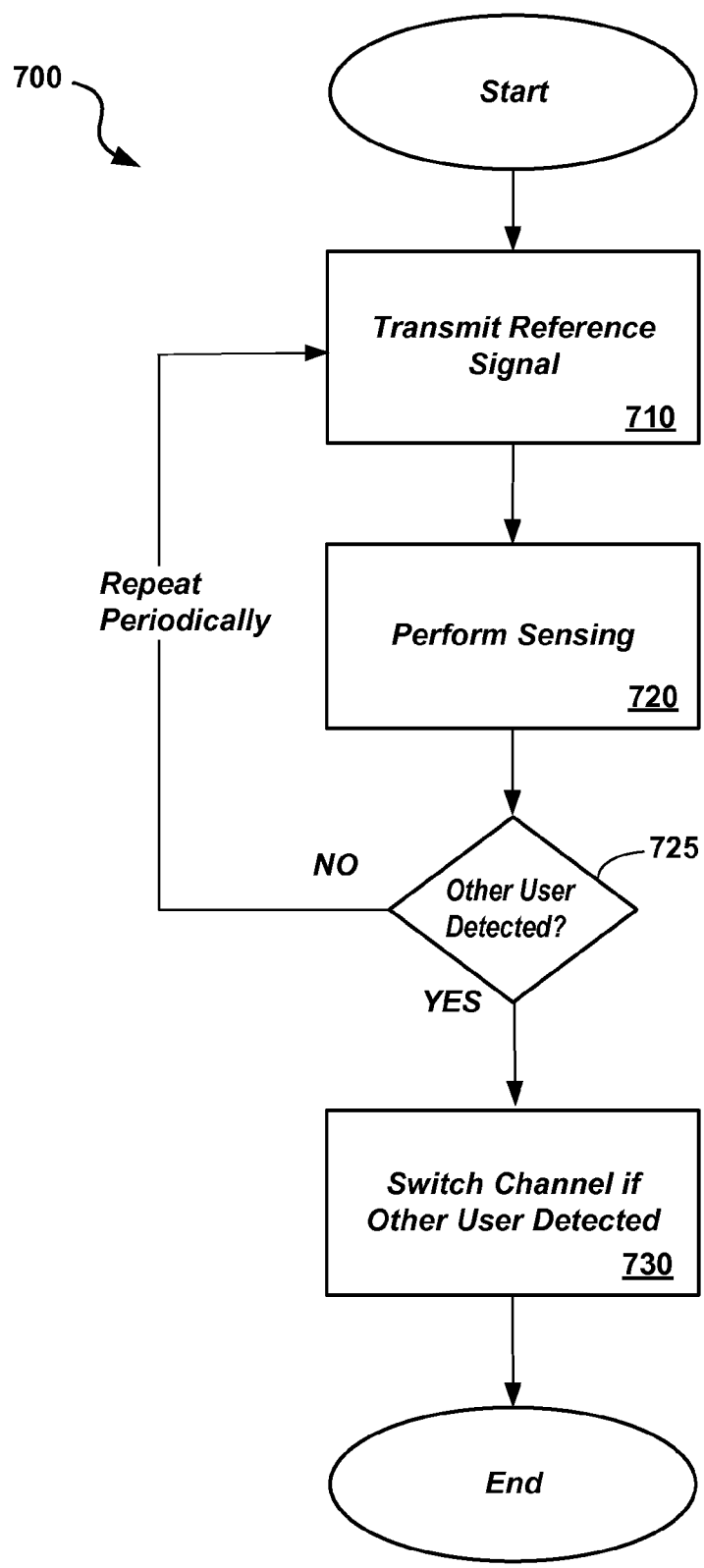
FIG. 7 illustrates an embodiment of a process for providing quiet period signaling and monitoring.

Attention is now directed to FIG. 7, which illustrates a process 700 for providing wireless communications. At stage 710, a reference signal is transmitted from a network node, such as a WS-eNB, in a first channel, exclusively during a plurality of subframes of a first frame period. The first frame period further includes a second plurality of subframes, wherein no signal is transmitted from the network node during this second plurality of subframes. The network node, such as a WS-eNB, may notify other network nodes, such as WS-UEs, of the quiet period so that the other network nodes may refrain from transmitting during the quiet period. At stage 720, a sensing operation may be performed. This may be a sensing operation to determine whether other users are occupying the channel. The other users may be, for example, primary users of the channel such as licensed users. The sensing process may be repeated periodically if no other users are sensed. The sensing may be based on standards for operation in WS channels, such as FCC standards or standards applicable in other jurisdictions.

Alternately, if other users are detected at stage 720, transmission may be switched to another channel. For example, if a primary user is detected, operation may be terminated within a predefined time frame, such as, for example, two seconds, and transmission switched to another channel. In addition, transmission in other frames may include reference signals transmitted on all subframes, or on a different set of subframes.

The channel may be a white space (WS) channel, such as a UHF television white space channel. The second plurality of subframes may consist of two subframes or three subframes. The reference signal may be a common or cell-specific reference signal (CRS), that is a DL reference signal provided for channel characteristic determination.

Figure 8:
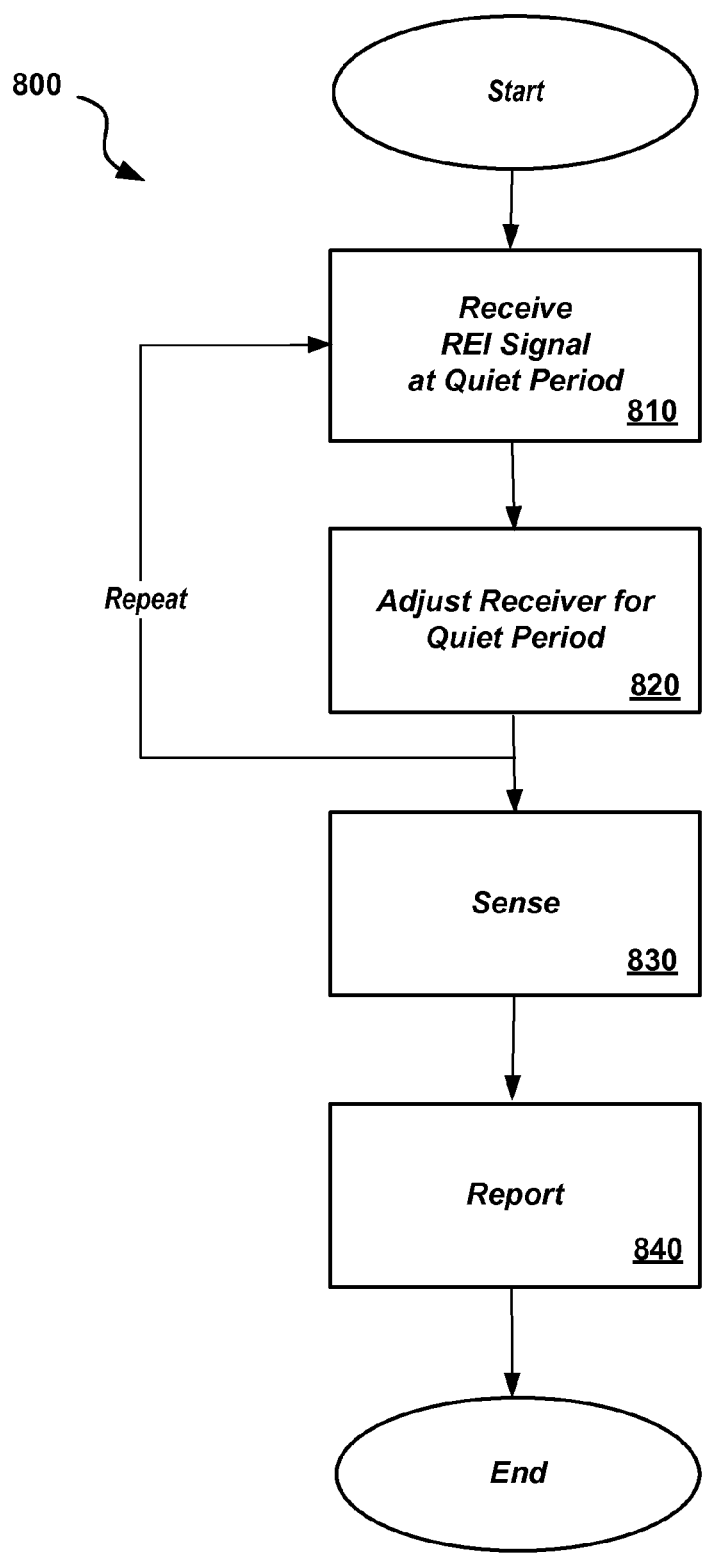
FIG. 8 illustrates an embodiment of a process for performing quiet period processing and monitoring.

Attention is now directed to FIG. 8, which illustrates a process 800 for wireless communications. At stage 810, a reference signal may be received in a first channel exclusively during a first plurality of subframes of a first frame period, wherein the first frame period further includes a second plurality of subframes corresponding to a quiet period during which no reference signal is transmitted. During the quiet period, the reference signal may be omitted from received signals transmitted from an associated wireless network node, such as a WS-eNB. At stage 820, a receiver parameter may be adjusted to compensate for omission of the reference signal during the quiet period. The adjusting may include freezing an input to a receive filter or loop. The filter or loop may be associated with a received signal metric, such as radio link (RLM) monitoring or other receiver functions. In related aspects, a transmission may be made on a second channel (e.g., a licensed channel).

The first channel may be a WS channel. The second plurality of subframes may consist of two or three subframes. The reference signal may be a common reference signal (CRS). Process 800 may further include, at stage 830, performing a sensing operation during the quiet period. The sensing operation may relate to detecting a primary user. At stage 840, information determined from the sensing operation may be reported via a second channel. The reported information may relate to a primary user, and the second channel may be a licensed channel.

Figure 9:
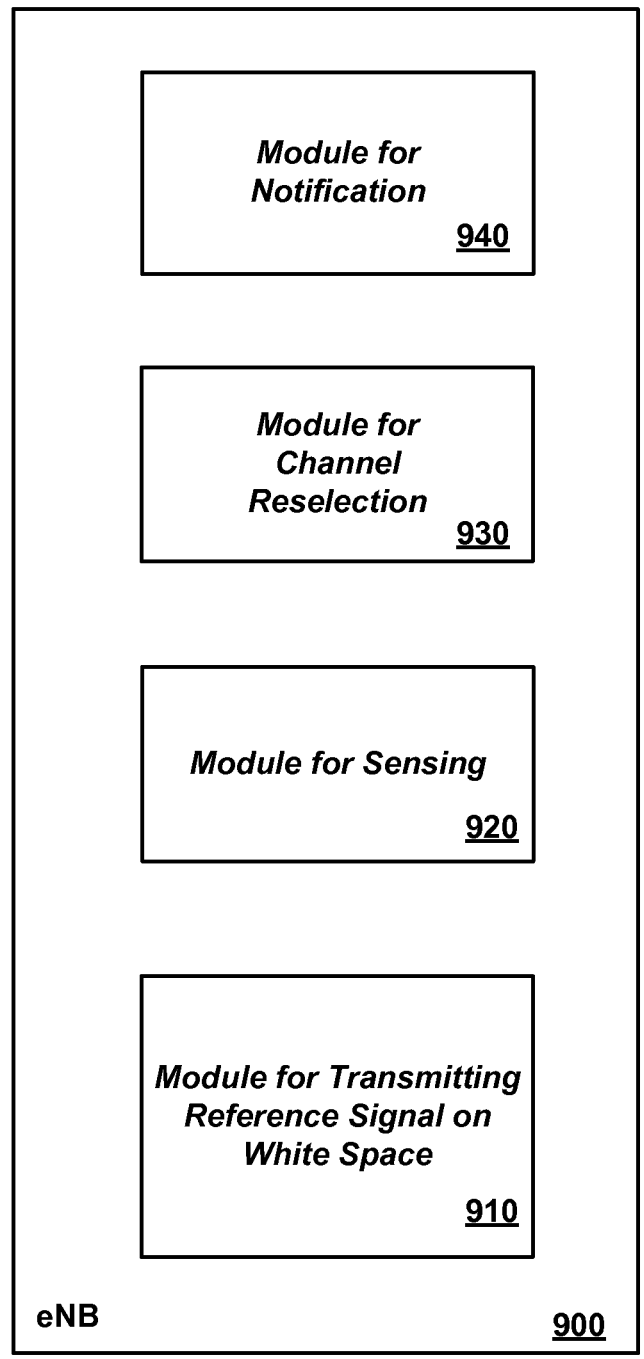
FIG. 9 illustrates an embodiment of a WS-enabled wireless network eNB.

Attention is now directed to FIG. 9, which illustrates details of an embodiment of an WS-eNB 900 configured for performing the functionality described herein. WS-eNB 900 may include a module 910 for sending a reference signal in a WS channel, wherein the reference signal may be halted during a quiet period. Sensing module 920 may be provided for monitoring the WS channel to determine whether other users are present, such as primary users. Channel switching module 930 may be provided to monitor and select a new channel or channels based on sensing and detection as may be performed in module 920. Module 930 may also be configured for initial WS channel monitoring before initiating use of the WS channel. Notification module 940 may be provided to notify other network nodes of particular quiet periods, such as via a SIB such as a SIB1. WS-eNB 900 may be configured as shown in FIG. 6.

Figure 10:
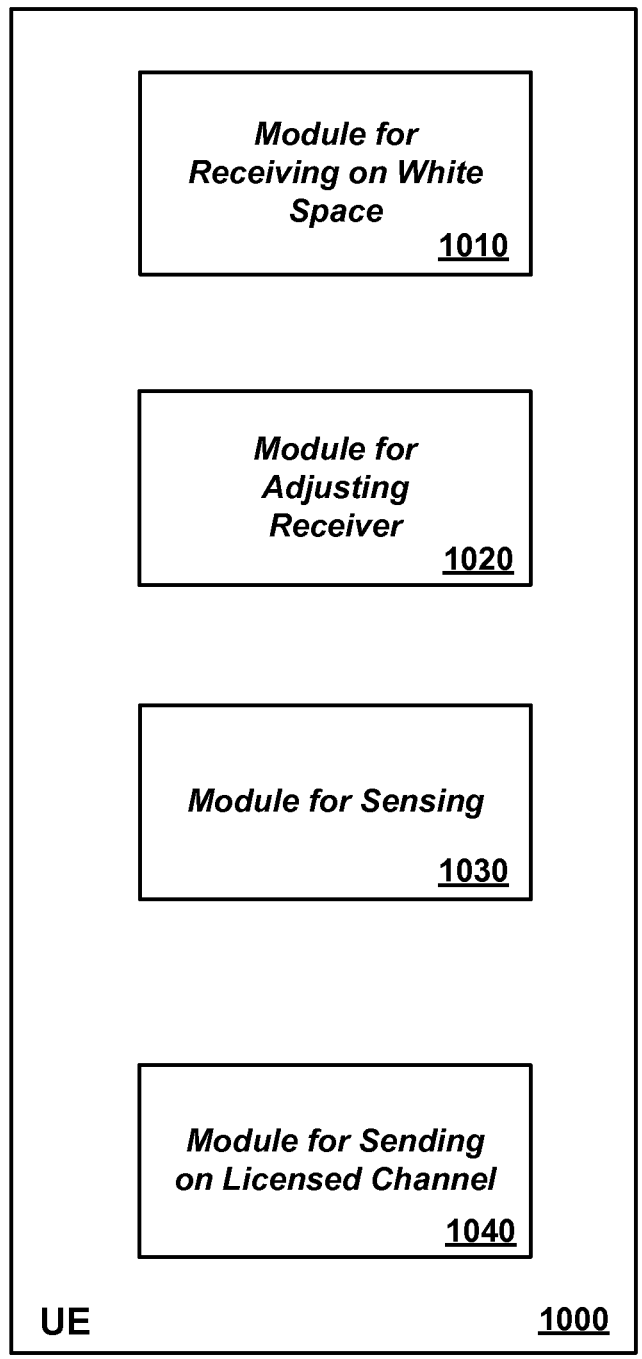
FIG. 10 illustrates an embodiment of a WS-enabled wireless network UE.

Attention is now directed to FIG. 10, which illustrates details of an embodiment of a WS-UE 1000 configured for performing the functionality described herein. WS-UE 1000 may include a receiver module 1010 configured to receive signals including reference signals on a WS channel and perform associated control and demodulation functions. Adjustment module 1020 may be configured to adjust a receiver parameter based on omitted signals during the quiet period, such as omitted CRS. UE 1000 may also include a sensing module 1030 configured to monitor the WS channel during the quiet period and detect, if present, other users, such as primary users. WS-UE 1000 may also include a sending module 1040 configured to send information to another network node, such as a WS-eNB. The information may include information regarding detection of other users at the WS-UE. The sending may be done on a licensed channel. WS-UE 1000 may be configured as shown in FIG. 6.

In some configurations, the apparatus for wireless communication includes means for performing various functions as described herein. In one aspect, the aforementioned means may be a processor or processors and associated memory in which embodiments of the invention reside, such as are shown in FIG. 6, and which are configured to perform the functions recited by the aforementioned means. The may be, for example, modules or apparatus residing in UEs, eNBs and/or other network devices such as are described or illustrated herein. In another aspect, the aforementioned means may be a module or any apparatus configured to perform the functions recited by the aforementioned means.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 11:
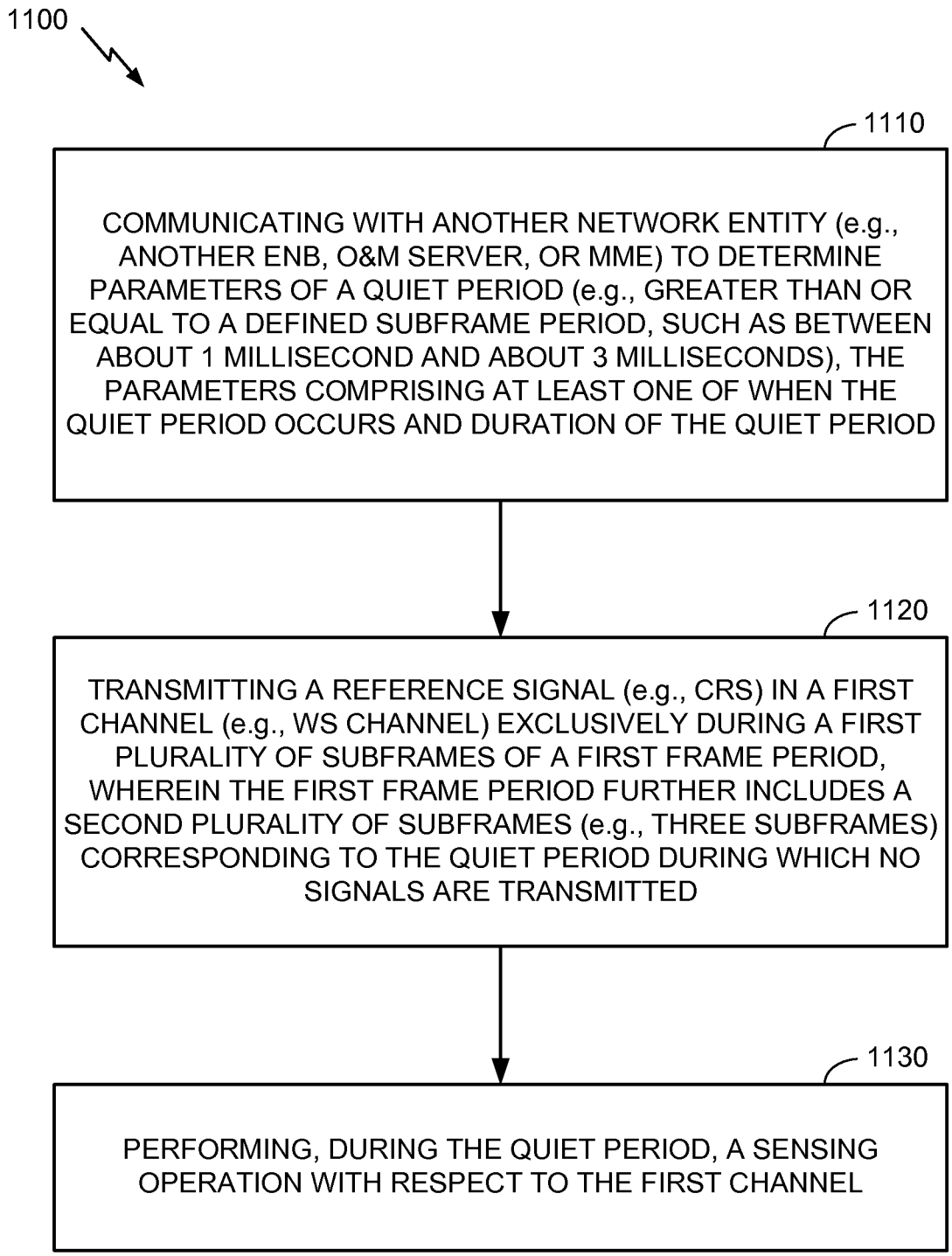
FIG. 11 illustrates an example cognitive radio methodology executable by a network entity (e.g., eNB).

In accordance with one or more aspects of the embodiments described herein, with reference to FIG. 11, there is shown a cognitive radio methodology 1100, operable by a network entity (e.g., an eNB, an operations and maintenance (O&M) server, a mobility management entity (MME), or the like). Specifically, method 1100 describes a way for the network entity to facilitate the suppression of reference signal transmissions to enable sensing in cognitive LTE. The method 1100 may involve, at 1110, communicating with another network entity (e.g., another eNB, an O&M server, and an MME) to determine parameters of a quiet period (e.g., greater than or equal to a defined subframe period, such as between about 1 millisecond and about 3 milliseconds), the parameters including at least one of when the quiet period occurs and duration of the quiet period. The method 1100 may involve, at 1120, transmitting a reference signal (e.g., CRS) in a first channel (e.g., WS channel) exclusively during a first plurality of subframes of a first frame period, wherein the first frame period further includes a second plurality of subframes (e.g., three subframes) corresponding to the quiet period during which no signals are transmitted. The method 1100 may involve, at 1130, performing, during the quiet period, a sensing operation with respect to the first channel.

Figure 12:
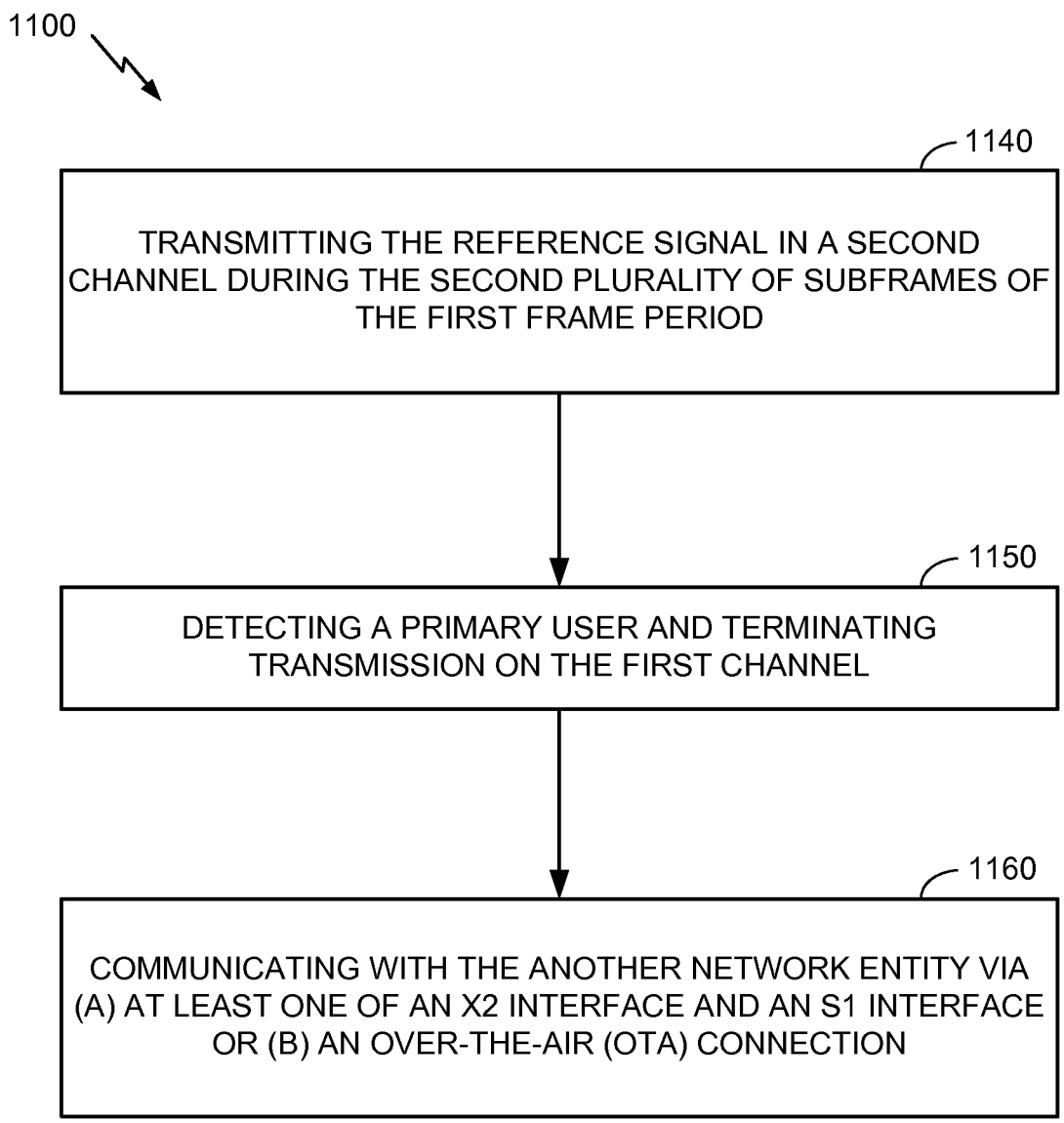
FIG. 12 illustrates further aspects of the methodology of FIG. 11.

With reference to FIG. 12, there are shown further operations or aspects of the method 1100 that are optional and may be performed by a network entity or the like. If the method 1100 includes at least one block of FIG. 12, then the method 1100 may terminate after the at least one block, without necessarily having to include any subsequent downstream block(s) that may be illustrated. It is further noted that numbers of the blocks do not imply a particular order in which the blocks may be performed according to the method 1100. For example, the method 1100 may involve transmitting the reference signal in a second channel during the second plurality of subframes of the first frame period (block 1140). Performing the sensing operation may involve detecting a primary user (block 1150). Communicating may involve communicating with the another network entity via (a) at least one of an X2 interface and an Si interface or (b) an over-the-air (OTA) connection (block 1160).

Figure 13:
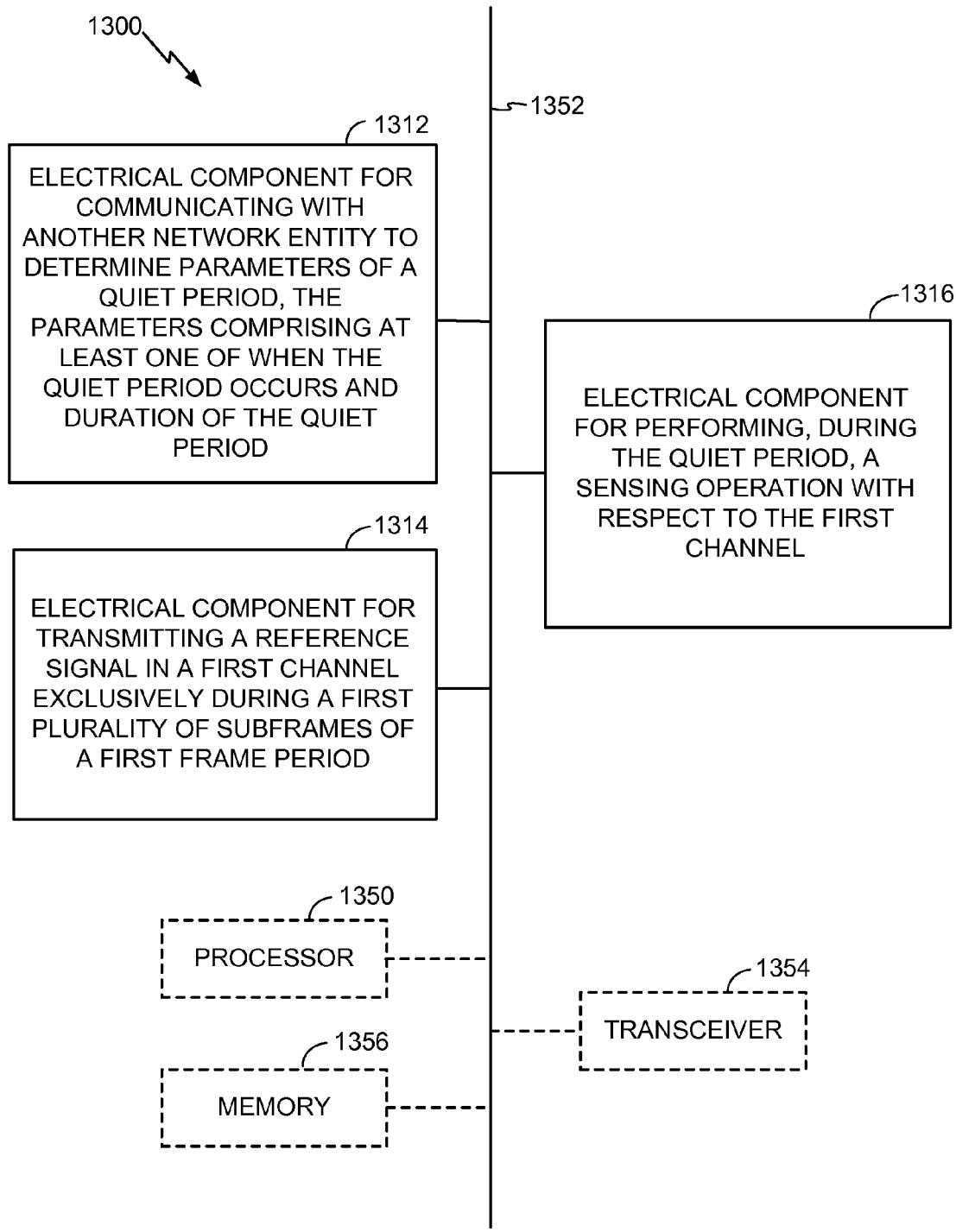
FIG. 13 shows an embodiment of an apparatus for cognitive radio communication, in accordance with the methodology of FIGS. 11-12.

In accordance with one or more aspects of the embodiments described herein, there are provided devices and apparatuses for power control, as described above with reference to FIGS. 11-12. With reference to FIG. 13, there is provided an exemplary apparatus 1300 that may be configured as a network entity (e.g., eNB) in a wireless network, or as a processor or similar device/component for use within the network entity. The apparatus 1300 may include functional blocks that can represent functions implemented by a processor, software, or combination thereof (e.g., firmware). For example, apparatus 1300 may include an electrical component or module 1312 for communicating with another network entity to determine parameters of a quiet period, the parameters including at least one of when the quiet period occurs and duration of the quiet period. The apparatus 1300 may also include a component 1314 for transmitting a reference signal in a first channel exclusively during a first plurality of subframes of a first frame period, wherein the first frame period further includes a second plurality of subframes corresponding to the quiet period during which no signals are transmitted. The apparatus 1300 may also include a component 1316 for performing, during the quiet period, a sensing operation with respect to the first channel.

In related aspects, the apparatus 1300 may optionally include a processor component 1350 having at least one processor, in the case of the apparatus 1300 configured as a network entity (e.g., an eNB), rather than as a processor. The processor 1350, in such case, may be in operative communication with the components 1312-1316 via a bus 1352 or similar communication coupling. The processor 1350 may effect initiation and scheduling of the processes or functions performed by electrical components 1312-1316.

In further related aspects, the apparatus 1300 may include a radio transceiver component 1354. A stand alone receiver and/or stand alone transmitter may be used in lieu of or in conjunction with the transceiver 1354. When the apparatus 1300 is an AP or similar network entity, the apparatus 1300 may also include a network interface (not shown) for connecting to one or more core network entities. The apparatus 1300 may optionally include a component for storing information, such as, for example, a memory device/component 1356. The computer readable medium or the memory component 1356 may be operatively coupled to the other components of the apparatus 1300 via the bus 1352 or the like. The memory component 1356 may be adapted to store computer readable instructions and data for effecting the processes and behavior of the components 1312-1316, and subcomponents thereof, or the processor 1350, or the methods disclosed herein. The memory component 1356 may retain instructions for executing functions associated with the components 1312-1316. While shown as being external to the memory 1356, it is to be understood that the components 1312-1316 can exist within the memory 1356. It is further noted that the components in FIG. 13 may comprise processors, electronic devices, hardware devices, electronic sub-components, logical circuits, memories, software codes, firmware codes, etc., or any combination thereof.

Figure 14:
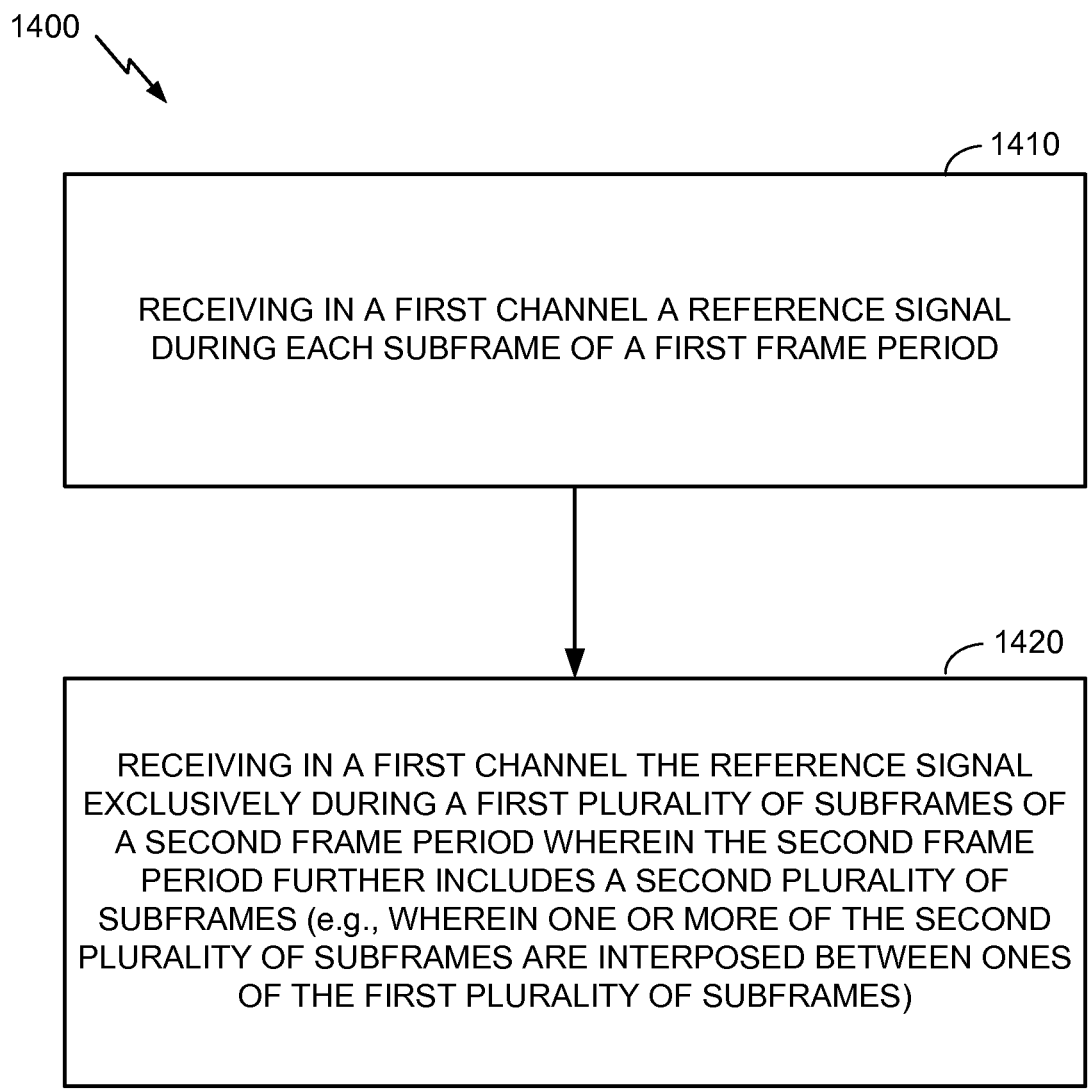
FIG. 14 illustrates an example cognitive radio methodology executable by a mobile entity (e.g., UE).

In accordance with one or more aspects of the embodiments described herein, with reference to FIG. 14, there is shown a methodology 1400, operable by a mobile entity (e.g., a UE) to facilitate the suppression of reference signal transmissions to enable sensing in cognitive LTE. The method 1400 may involve, at 1410, receiving in a first channel a reference signal during each subframe of a first frame period. The method 1400 may also involve, at 1420, receiving in a first channel the reference signal exclusively during a first plurality of subframes of a second frame period wherein the second frame period further includes a second plurality of subframes (e.g., wherein one or more of the second plurality of subframes are interposed between ones of the first plurality of subframes).

Figure 15:
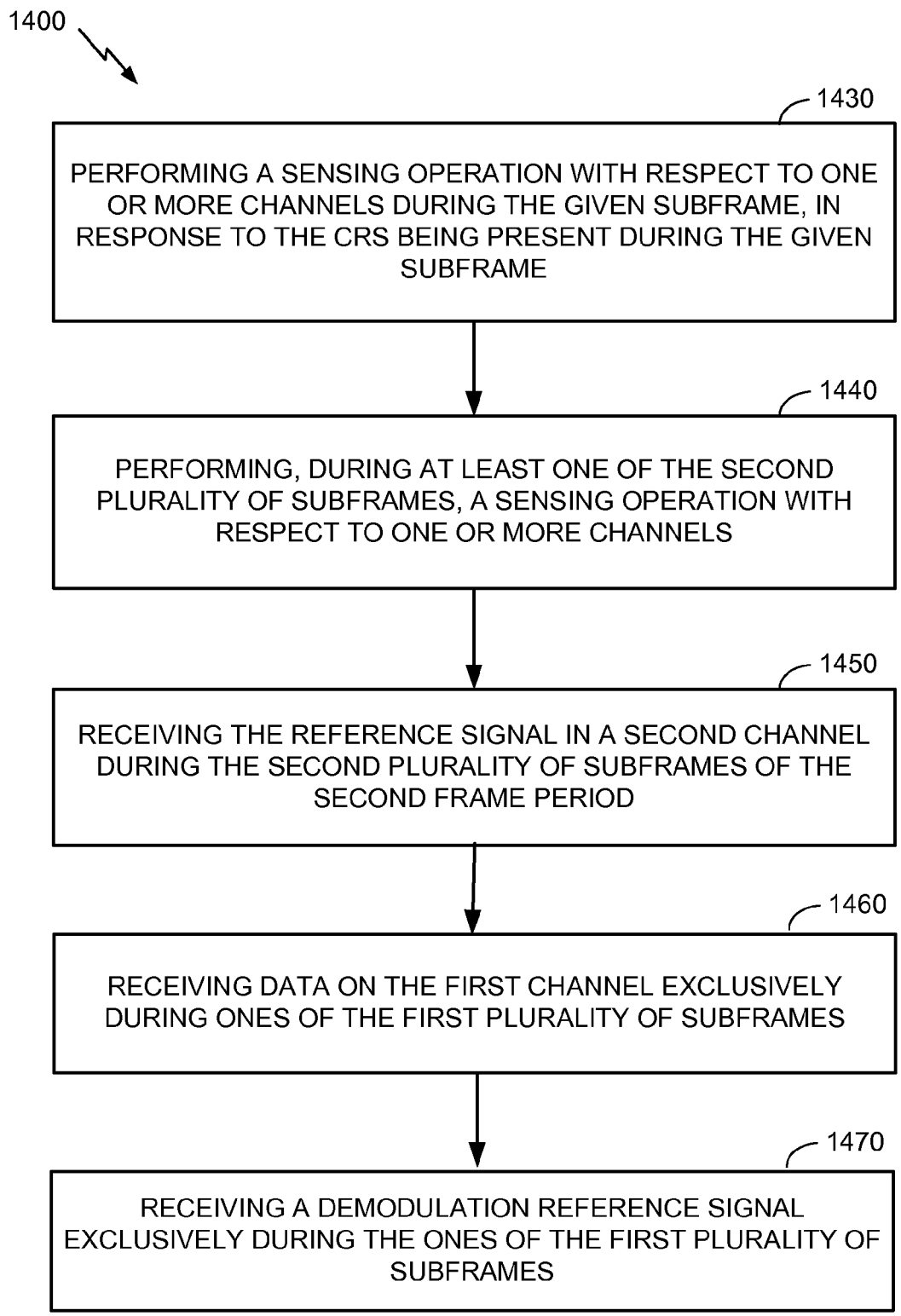
FIG. 15 illustrates further aspects of the methodology of FIG. 14.

With reference to FIG. 15, there are shown further operations or aspects of the method 1400 that are optional and may be performed by a mobile entity or the like. If the method 1400 includes at least one block of FIG. 15, then the method 1400 may terminate after the at least one block, without necessarily having to include any subsequent downstream block(s) that may be illustrated. It is further noted that numbers of the blocks do not imply a particular order in which the blocks may be performed according to the method 1400. For example, the method 1400 may involve performing a sensing operation with respect to one or more channels during the given subframe, in response to the CRS being present during the given subframe (block 1430). The method 1400 may involve performing, during at least one of the second plurality of subframes, a sensing operation with respect to one or more channels (block 1440). The method 1400 may involve receiving the reference signal in a second channel during the second plurality of subframes of the second frame period (block 1450). The method 1400 may involve receiving data on the first channel exclusively during ones of the first plurality of subframes (block 1460), and receiving a demodulation reference signal exclusively during the ones of the first plurality of subframes (block 1470). In another embodiment, the reference signal may optionally include an indication of whether a CRS is present during a given subframe.

Figure 16:
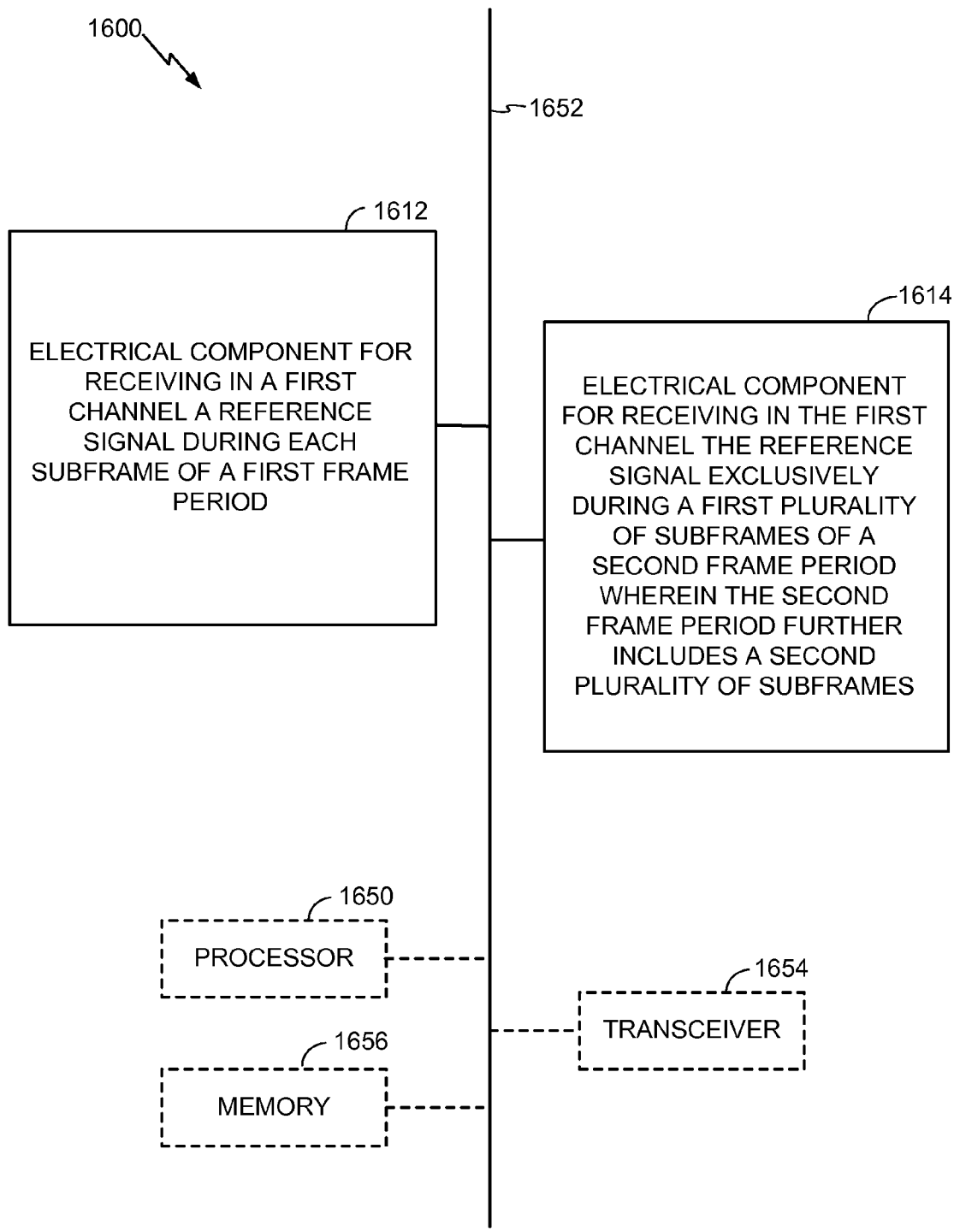
FIG. 16 shows an embodiment of an apparatus for cognitive radio communication, in accordance with the methodology of FIGS. 14-15.

In accordance with one or more aspects of the embodiments described herein, FIG. 16 shows a design of an apparatus 1600 (e.g., a mobile entity or component(s) thereof) for cognitive radio communication, as described above with reference to FIGS. 14-15. For example, apparatus 1600 may include an electrical component or module 1612 for receiving in a first channel a reference signal during each subframe of a first frame period, the reference signal including an indication of whether a CRS is present during a given subframe. The apparatus 1600 may include a component 1614 for receiving in the first channel the reference signal exclusively during a first plurality of subframes of a second frame period wherein the second frame period further includes a second plurality of subframes. For the sake of conciseness, the rest of the details regarding apparatus 1600 are not further elaborated on; however, it is to be understood that the remaining features and aspects of the apparatus 1600 are substantially similar to those described above with respect to apparatus 1300 of FIG. 13.

In accordance with one or more aspects of the embodiments described herein, there is provided a method that involves transmitting a reference signal in a first channel exclusively during a first plurality of subframes of a first frame period, wherein the first frame period further includes a second plurality of subframes corresponding to a quiet period during which no signals are transmitted and performing, during the quiet period, a sensing operation with respect to the channel. The channel may be a WS channel. The second plurality of subframes may consist of two subframes or three subframes. The reference signal may be a CRS. The sensing operation may involve detecting a primary user. The sensing operation may involve detecting a secondary user. The method may further involve terminating transmission on the first channel.

In related aspects, the disclosure is related to a method that involves transmitting a reference signal during each subframe of a first frame period, transmitting the reference signal exclusively during a first plurality of subframes of a second frame period wherein the second frame period further includes a second plurality of subframes corresponding to one or more quiet periods, and performing, during the one or more quiet periods, a sensing operation with respect to one or more channels.

The one or more quiet periods may be interposed between ones of the first plurality of subframes. The reference signal is transmitted on a first of the one or more channels. The sensing operation may be performed with respect to the first of the one or more channels and a second of the one or more channels. Each of the one or more quiet periods may extend over a second plurality of subframes of the second frame period. The method may further including scheduling data for transmission during at least one of the first plurality of subframes and refraining from scheduling data for transmission during any of the one or more quiet periods. The reference signal may be/include a CRS, and the method may further involve scheduling a demodulation reference signal for transmission during the at least one of the first plurality of subframes and refraining from scheduling the demodulation reference signal for transmission during any of the one or more quiet periods.

In further related aspects, the disclosure is related to a method that involves receiving a reference signal during each subframe of a first frame period, receiving the reference signal exclusively during a first plurality of subframes of a second frame period wherein the second frame period further includes a second plurality of subframes, and performing, during at least one of the second plurality of subframes, a sensing operation with respect to one or more channels. The one or more of the second plurality of subframes may be interposed between ones of the first plurality of subframes. The reference signal may be transmitted on a first of the one or more channels. The sensing operation may be performed with respect to the first of the one or more channels and a second of the one or more channels.

The method may further involve receiving data exclusively during ones of the first plurality of subframes. The reference signal may be/include a CRS and method may further include receiving a demodulation reference signal exclusively during the ones of the first plurality of subframes.

In yet further related aspects, the disclosure is related to a method that involves receiving a reference signal in a first channel exclusively during a first plurality of subframes of a first frame period, wherein the first frame period further includes a second plurality of subframes corresponding to a quiet period during which no reference signal is transmitted and adjusting a receiver parameter to compensate for omission of a reference signal during the quiet period. The first channel may be a WS channel. The second plurality of subframes may consists of two subframes or three subframes. The reference signal may be a CRS. The method may further involve performing a sensing operation during the quiet period. The sensing operation may involve detecting a primary user. The method may further involve reporting, via a second channel, information determined from the sensing operation. The information may relate to a primary user. The second channel may be a licensed channel.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method operable by a network entity in a wireless communication system, comprising:
   communicating with another network entity to determine parameters of a quiet period, the parameters comprising at least one of when the quiet period occurs and duration of the quiet period;
   transmitting, by the network entity, a reference signal in a first channel exclusively during a first plurality of subframes of a first frame period, wherein the first frame period further includes a second plurality of subframes corresponding to the quiet period during which no signals are transmitted, wherein the first channel is a white-space channel;
   transmitting, by the network entity, the reference signal in a second channel during the second plurality of subframes of the first frame period, wherein the second channel is a licensed channel; and
   performing, during the quiet period, a sensing operation with respect to the first channel.

2. The method of claim 1, wherein the reference signal is a common reference signal (CRS).

3. The method of claim 1, wherein the second plurality of subframes consists of three subframes.

4. The method of claim 1, wherein the sensing operation comprises detecting a primary user.

5. The method of claim 4, further comprising terminating transmission on the first channel.

6. The method of claim 1, wherein the quiet period is greater than or equal to a defined subframe period.

7. The method of claim 1, wherein the quiet period is between about 1 millisecond and about 3 milliseconds.

8. The method of claim 1, wherein communicating comprises communicating with the another network entity via (a) at least one of an X2 interface and an S1 interface or (b) an over-the-air (OTA) connection.

9. The method of claim 1, wherein:
   the network entity comprises an evolved Node B (eNB); and
   the another network entity comprises one of another eNB, an operations and maintenance (O&M) server, and a mobility management entity (MME).

10. An apparatus, comprising:
    at least one processor configured to: (a) communicate with another network entity to determine parameters of a quiet period, the parameters comprising at least one of when the quiet period occurs and duration of the quiet period; (b) transmit a reference signal in a first channel exclusively during a first plurality of subframes of a first frame period, wherein the first frame period further includes a second plurality of subframes corresponding to the quiet period during which no signals are transmitted, wherein the first channel is a white-space channel; (c) transmit the reference signal in a second channel during the second plurality of subframes of the first frame period, wherein the second channel is a licensed channel; and (d) perform, during the quiet period, a sensing operation with respect to the first channel; and
    a memory coupled to the at least one processor for storing data.

11. An apparatus, comprising:
    means for communicating with another network entity to determine parameters of a quiet period, the parameters comprising at least one of when the quiet period occurs and duration of the quiet period;
    means for transmitting a reference signal in a first channel exclusively during a first plurality of subframes of a first frame period, wherein the first frame period further includes a second plurality of subframes corresponding to the quiet period during which no signals are transmitted, wherein the first channel is a white-space channel;
    means for transmitting the reference signal in a second channel during the second plurality of subframes of the first frame period, wherein the second channel is a licensed channel; and
    means for performing, during the quiet period, a sensing operation with respect to the first channel.

12. A computer program product, comprising:
    a non-transitory computer-readable medium comprising code for causing a computer to:
    communicate with another network entity to determine parameters of a quiet period, the parameters comprising at least one of when the quiet period occurs and duration of the quiet period;
    transmit a reference signal in a first channel exclusively during a first plurality of subframes of a first frame period, wherein the first frame period further includes a second plurality of subframes corresponding to the quiet period during which no signals are transmitted, wherein the first channel is a white-space channel;
    transmit the reference signal in a second channel during the second plurality of subframes of the first frame period, wherein the second channel is a licensed channel; and
    perform, during the quiet period, a sensing operation with respect to the first channel.

13. A method operable by a mobile entity in a wireless communication system, comprising:
    receiving, by the mobile entity, in a first channel a reference signal during each subframe of a first frame period, wherein the first channel is a white-space channel;
    receiving, by the mobile entity, in the first channel the reference signal exclusively during a first plurality of subframes of a second frame period wherein the second frame period further includes a second plurality of subframes; and
    receiving, by the mobile entity, the reference signal in a second channel during the second plurality of subframes of the second frame period, wherein the second channel is a licensed channel.

14. The method of claim 13, further comprising performing a sensing operation with respect to one or more channels during a given subframe, in response to a common reference signal (CRS) being present during the given subframe.

15. The method of claim 13, further comprising performing, during at least one of the second plurality of subframes, a sensing operation with respect to one or more channels.

16. The method of claim 13, wherein one or more of the second plurality of subframes are interposed between ones of the first plurality of subframes.

17. The method of claim 13, further comprising receiving data on the first channel exclusively during ones of the first plurality of subframes.

18. The method of claim 13, wherein:
the mobile entity comprises a user equipment (UE);
the reference signal comprises a common reference signal (CRS); and
the method further comprises receiving a demodulation reference signal exclusively during the ones of the first plurality of subframes.

19. An apparatus, comprising:
at least one processor configured to: (a) receive in a first channel a reference signal during each subframe of a first frame period, wherein the first channel is a white-space channel; (b) receive in the first channel the reference signal exclusively during a first plurality of subframes of a second frame period wherein the second frame period further includes a second plurality of subframes; and (c) receive the reference signal in a second channel during the second plurality of subframes of the second frame period, wherein the second channel is a licensed channel; and
a memory coupled to the at least one processor for storing data.

20. An apparatus, comprising:
means for receiving in a first channel a reference signal during each subframe of a first frame period, wherein the first channel is a white-space channel;
means for receiving in the first channel the reference signal exclusively during a first plurality of subframes of a second frame period wherein the second frame period further includes a second plurality of subframes; and
means for receiving the reference signal in a second channel during the second plurality of subframes of the second frame period, wherein the second channel is a licensed channel.

21. A computer program product, comprising:
a non-transitory computer-readable medium comprising code for causing a computer to:
receive in a first channel a reference signal during each subframe of a first frame period, wherein the first channel is a white-space channel;
receive in the first channel the reference signal exclusively during a first plurality of subframes of a second frame period wherein the second frame period further includes a second plurality of subframes; and
receive the reference signal in a second channel during the second plurality of subframes of the second frame period, wherein the second channel is a licensed channel.

* * * * *